(12) United States Patent
Jones et al.

(10) Patent No.: US 10,688,945 B2
(45) Date of Patent: Jun. 23, 2020

(54) SUBSTRATE FOR A VEHICLE SEAT ASSEMBLY

(71) Applicant: Lear Corporation, Southfield, MI (US)

(72) Inventors: Paul Jones, West Midlands (GB); Kevin Farley, Newcastle-upon-Tyne (GB); Stefan Gottauf, Ismaning (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/188,365

(22) Filed: Nov. 13, 2018

(65) Prior Publication Data
US 2019/0143913 A1 May 16, 2019

(30) Foreign Application Priority Data
Nov. 10, 2017 (DE) ................. 10 2017 220 077

(51) Int. Cl.
*B60R 16/02* (2006.01)
*B60N 2/70* (2006.01)
(Continued)

(52) U.S. Cl.
CPC .......... *B60R 16/0215* (2013.01); *B60N 2/682* (2013.01); *B60N 2/686* (2013.01);
(Continued)

(58) Field of Classification Search
CPC ... B60R 16/0215; B60R 16/03; B60R 16/037; B60N 2/914; B60N 2/682; B60N 2/686;
(Continued)

(56) References Cited

U.S. PATENT DOCUMENTS 5,658,050 A * 8/1997 Lorbiecki ................. B62J 1/12
297/452.41
5,752,845 A * 5/1998 Fu ........................ B60N 2/0224
439/247
(Continued)

FOREIGN PATENT DOCUMENTS

CN 105501148 A 4/2016
DE 102005059854 B4 10/2008
(Continued)

OTHER PUBLICATIONS

German Office Action for Application No. 10 2017 220 077.4, dated Jul. 23, 2019, 6 pages.

*Primary Examiner* — Mark R Wendell
(74) *Attorney, Agent, or Firm* — Brooks Kushman P.C.

(57) ABSTRACT

A substrate is mounted to a vehicle seat frame, to provide a support surface for an occupant. The seat substrate is formed with a pair of guides to receive a pair of suspension wires of a vehicle seat suspension for translation of the pair of suspension wires within the pair of guides and to distribute an occupant load from the pair of suspension wires to the substrate. An air bladder is fastened to a plurality of retainers on the substrate. A first plurality of terminals is mounted to the substrate for electrical connection to a wire harness. A second plurality of terminals is mounted to the substrate, each in electrical communication with one of the first plurality of terminals, for electrical connection to a plurality of electrical devices in the vehicle seat assembly.

15 Claims, 4 Drawing Sheets

(51) Int. Cl.
  *B60N 2/72* (2006.01)
  *B60N 2/90* (2018.01)
  *B60N 2/68* (2006.01)
  *B60R 16/03* (2006.01)
  *B60R 16/037* (2006.01)
  *B60N 2/02* (2006.01)

(52) U.S. Cl.
  CPC ............. *B60N 2/7094* (2013.01); *B60N 2/72* (2013.01); *B60N 2/914* (2018.02); *B60R 16/03* (2013.01); *B60R 16/037* (2013.01); *B60N 2002/0264* (2013.01)

(58) Field of Classification Search
  CPC . B60N 2/7094; B60N 2/72; B60N 2002/0264
  USPC ................................................... 297/452.18
  See application file for complete search history.

(56) References Cited

U.S. PATENT DOCUMENTS

| | | | | |
|---|---|---|---|---|
| 6,161,891 | A * | 12/2000 | Blakesley | B60N 2/002 177/136 |
| 6,231,076 | B1 * | 5/2001 | Blakesley | B60R 22/18 180/271 |
| 6,429,544 | B1 * | 8/2002 | Sasaki | B60N 2/0224 307/10.1 |
| 6,720,671 | B2 * | 4/2004 | Kondo | B60N 2/002 174/72 A |
| 9,039,081 | B2 * | 5/2015 | Arefi | B60N 2/686 297/188.12 |
| 9,610,871 | B2 | 4/2017 | Yasuda et al. | |
| 9,676,311 | B2 | 6/2017 | Murolo et al. | |
| 9,856,532 | B2 | 1/2018 | Hood et al. | |
| 2008/0001447 | A1 * | 1/2008 | Humer | B60N 2/4228 297/216.12 |
| 2010/0066136 | A1 * | 3/2010 | D'Agostini | B60N 2/4228 297/216.12 |
| 2012/0126591 | A1 * | 5/2012 | Ruthinowski | B60N 2/4263 297/216.1 |
| 2014/0054948 | A1 * | 2/2014 | Bachar | A47C 7/02 297/452.48 |
| 2017/0036578 | A1 | 2/2017 | White et al. | |

FOREIGN PATENT DOCUMENTS

| | | |
|---|---|---|
| DE | 102009035430 A1 | 12/2010 |
| DE | 102011116905 B4 | 4/2015 |
| DE | 102016215048 A1 | 2/2018 |
| EP | 1186468 A1 | 3/2002 |
| JP | 2014231255 A | 12/2014 |
| JP | 2016037144 A | 3/2016 |
| JP | 2016094100 A | 5/2016 |

* cited by examiner

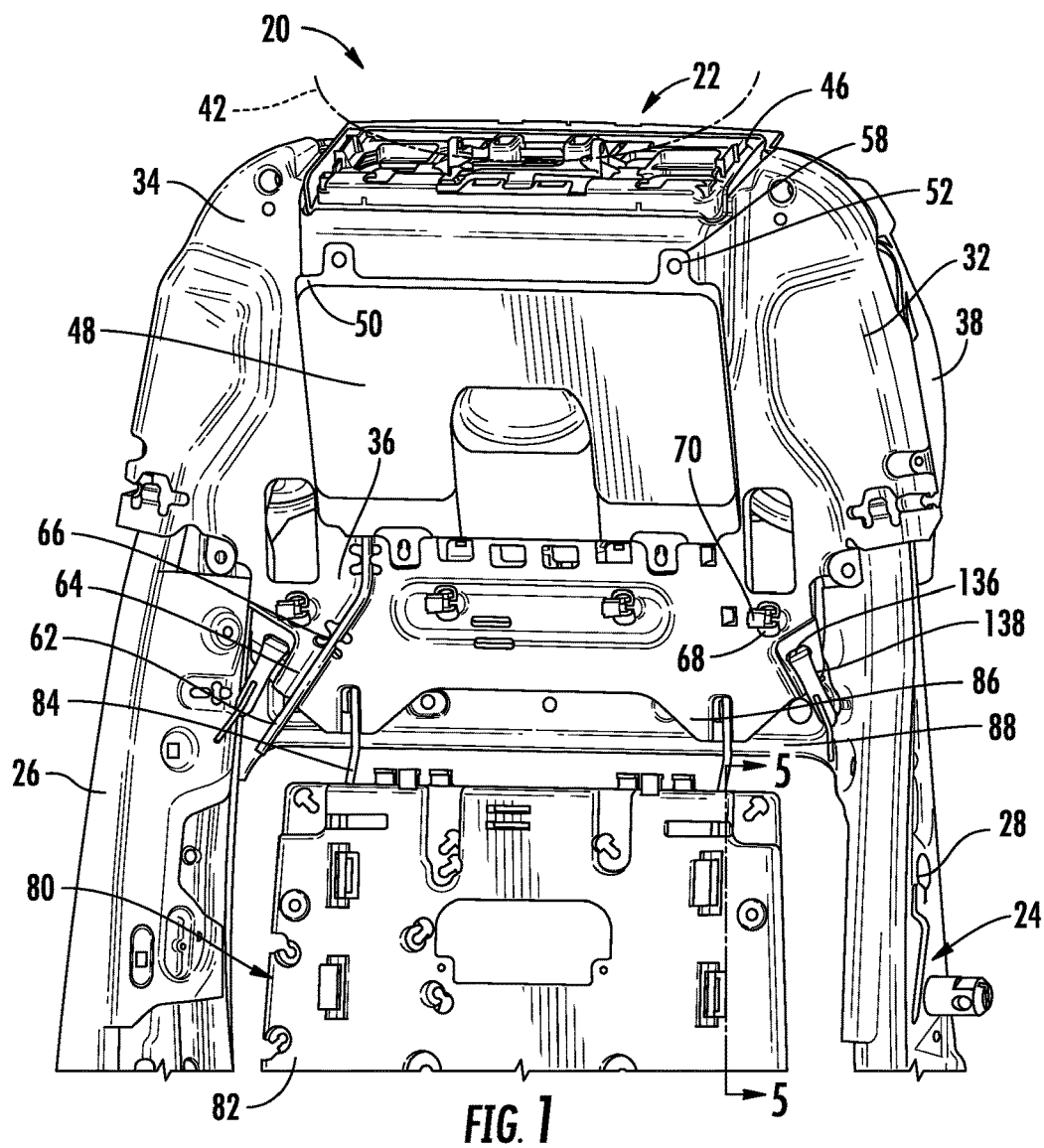
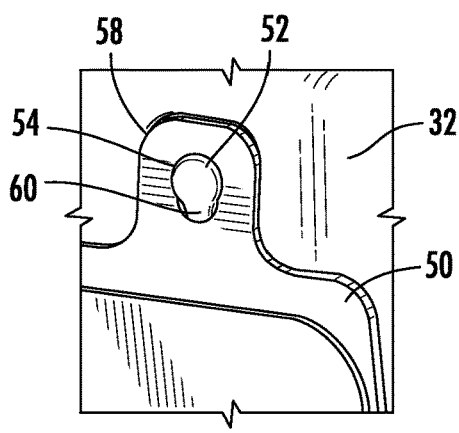
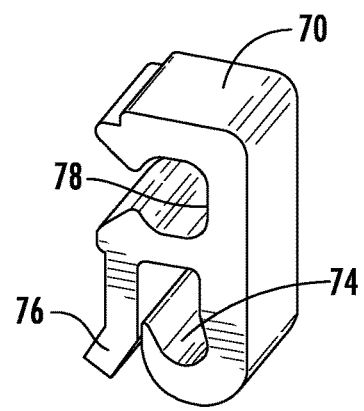

SUBSTRATE FOR A VEHICLE SEAT ASSEMBLY

CROSS-REFERENCE TO RELATED APPLICATIONS

This application claims foreign priority benefits under 35 U.S.C. § 119(a)-(d) to DE 10 2017 220 077.4, filed Nov. 10, 2017, the disclosure of which is hereby incorporated by reference in its entirety.

TECHNICAL FIELD

Various embodiments relate to substrates for vehicle seat assemblies, vehicle seat subassemblies, and methods for assembling vehicle seat assemblies.

BACKGROUND

The prior art has provided substrates for vehicle seat assemblies.

SUMMARY

According to an embodiment, a seat substrate is adapted to be mounted to a frame of a vehicle seat assembly, to provide a support surface for an occupant. The seat substrate is formed with a pair of guides. Each guide is sized to receive one of a pair of suspension wires of a vehicle seat suspension for translation of the pair of suspension wires within the pair of guides and to distribute an occupant load from the pair of suspension wires to the substrate.

According to another embodiment, a vehicle seat assembly is provided with a vehicle seat frame. A seat substrate is mounted to the vehicle seat frame, to provide a support surface for an occupant. The seat substrate is formed with a pair of guides. Each guide is sized to receive one of a pair of suspension wires of a vehicle seat suspension for translation of the pair of suspension wires within the pair of guides and to distribute an occupant load from the pair of suspension wires to the substrate. A vehicle seat suspension is mounted to the vehicle seat frame, with a pair of suspension wires extending into the pair of guides.

According to another embodiment, a seat subassembly is provided with a substrate adapted to be mounted to a frame of a vehicle seat assembly, to provide a support surface for an occupant. A plurality of retainers is provided on the substrate. An air bladder is fastened to the plurality of retainers.

According to another embodiment, a method of assembling a seat assembly assembles a seat subassembly with a substrate adapted to be mounted to a frame of a vehicle seat assembly, to provide a support surface for an occupant. A plurality of retainers is provided on the substrate. An air bladder is fastened to the plurality of retainers. The assembled seat subassembly is assembled to a frame of a vehicle seat assembly.

According to another embodiment, a seat subassembly is provided with a substrate adapted to be mounted to a frame of a vehicle seat assembly. A first plurality of terminals is mounted to the substrate for electrical connection to a wire harness. A second plurality of terminals is mounted to the substrate, each in electrical communication with one of the first plurality of terminals, for electrical connection to a plurality of electrical devices in the vehicle seat assembly.

According to another embodiment, a vehicle seat assembly is provided with a vehicle seat frame. A seat subassembly is provided with a substrate mounted to a frame of a vehicle seat assembly. A first plurality of terminals is mounted to the substrate for electrical connection to a wire harness. A second plurality of terminals is mounted to the substrate, each in electrical communication with one of the first plurality of terminals, for electrical connection to a plurality of electrical devices in the vehicle seat assembly. A wire harness is mounted to the vehicle seat frame. The wire harness has a plurality of wires, each electrically connected to one of the first plurality of terminals.

According to another embodiment, a method of assembling a seat assembly assembles a seat subassembly with a substrate adapted to be mounted to a frame of a vehicle seat assembly. A first plurality of terminals is mounted to the substrate for electrical connection to a wire harness. A second plurality of terminals is mounted to the substrate, each in electrical communication with one of the first plurality of terminals, for electrical connection to a plurality of electrical devices in the vehicle seat assembly. The assembled seat subassembly is assembled to the frame of the vehicle seat assembly.

BRIEF DESCRIPTION OF THE DRAWINGS

FIG. 1 is a partial front perspective view of a seat assembly according to an embodiment, illustrated partially disassembled to reveal underlying components;

FIG. 3 is an enlarged partial front perspective view of the seat assembly of FIG. 1, illustrating a retainer according to an embodiment;

FIG. 4 is an enlarged perspective view of another retainer of the seat assembly of FIG. 1, according to another embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Seat assemblies, such as vehicle seat assemblies, provide multiple functions, such as occupant support, comfort and wellness, adjustability, entertainment and the like. Many challenges are faced in providing all of the functionality within a seat; and such challenges include packaging design, manufacturing and assembly. Prior art seat assemblies have included frames and functional carriers to collectively provide structural support to the occupant.

Figure 2:
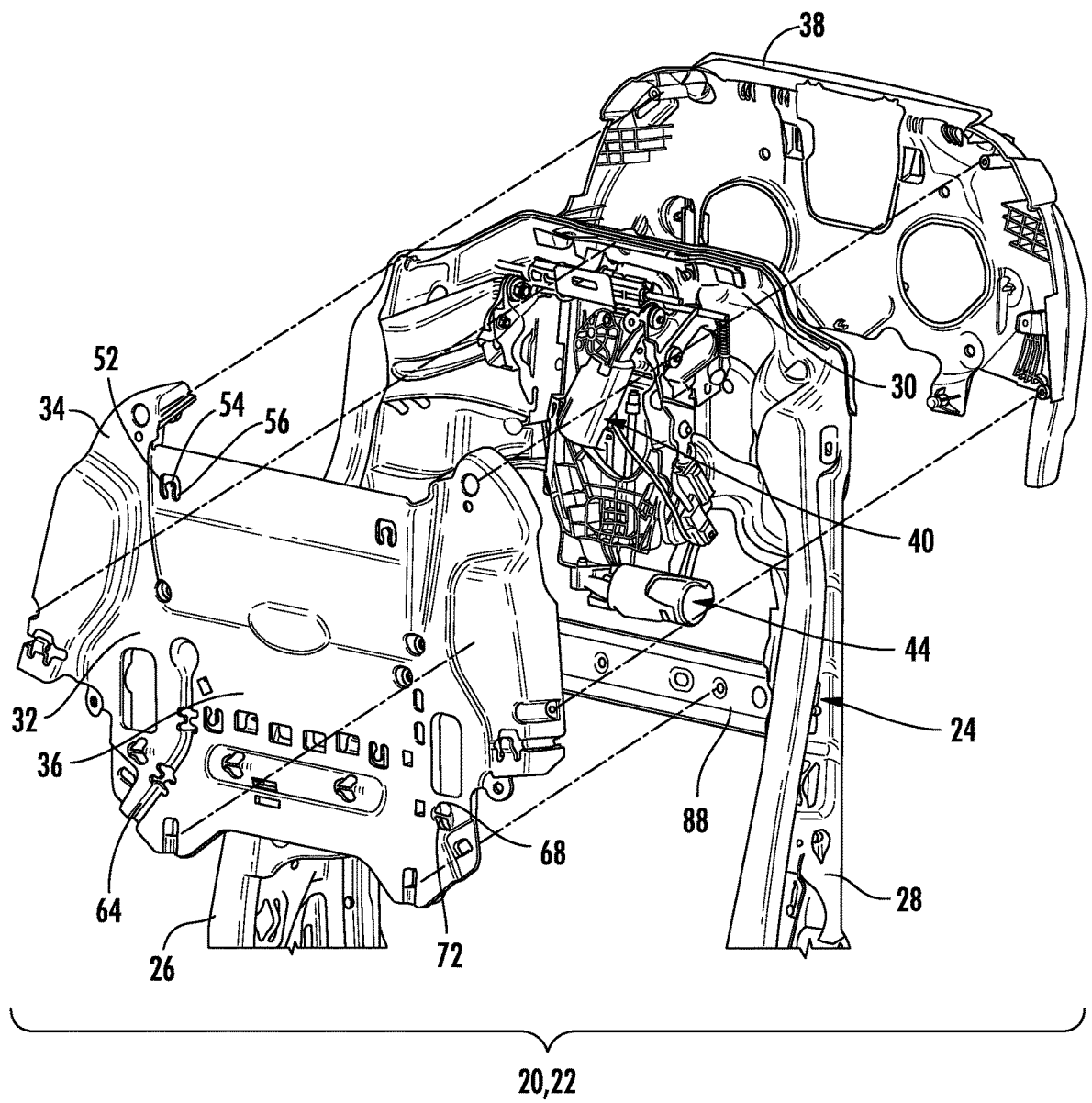
FIG. 2 is an exploded partial perspective view of the seat assembly of FIG. 1.

FIGS. 1 and 2 illustrate a seat assembly according to an embodiment and referenced generally by numeral 20. The seat assembly 20 is illustrated as an automotive seat assembly 20. However, any vehicle seat assembly 20 is contemplated, such as aircraft, watercraft, spacecraft, or any land vehicle. Any seat assembly is contemplated, such as an office seat assembly or the like.

The seat assembly 20 in FIGS. 1 and 2 is illustrated partially disassembled with trim and cushioning removed to reveal the underlying components. The seat assembly 20 includes a seat back 22 with a frame 24. The frame 24 may be formed from stamped metal components as is known in the art. The frame 24 may also include a pair of side members 26, 28 and an upper cross member 30, which may be formed separately and welded or otherwise fastened together. The seat assembly 20 also includes a carrier or substrate 32 mounted to the frame 24 to add additional structural support to the seat assembly 20 while integrating multi-functional features into a hardware package of the seat assembly 20.

The multi-functional carrier 32 may be formed of a high strength polymeric material. For the depicted example, the seat back 22 is capable of lying flat for a resting occupant. Applicable loads in flat lying seat back 22 include concentrated loads of the occupant's weight caused by kneeling. Accordingly, the frame 24 and the carrier 32 are sufficiently robust to support the applicable loads. For example, the carrier 32 may be formed from a fiber-reinforced injection molded plastic, such as injection molded polypropylene with thirty percent fiberglass.

The carrier 32 is shaped to cover intersections of the upper cross member 30 with the pair of side members 26, 28 with integrated shoulder support 34 for the occupant, and to cover sharp edges in the sheet metal and the intersections of these frame members 26, 28, 30. The carrier 32 also includes a support surface 36 for installation of foam (not shown) for comfort and support to the occupant. The carrier 32 is fastened to the frame 24 and to a cover 38, which is spaced apart from the carrier 32 with the upper cross member 30 between the carrier 32 and the cover 38.

The carrier 32 has various integrated features, which may be standard or optional for various seat assemblies 20. Therefore, the carrier 32 is modular and can be utilized in various seat assemblies 20 even when all of the available features are not employed. This modularity permits a common carrier 32 for different seat assemblies 20, thereby reducing tooling and manufacturing costs.

Referring now to FIG. 2, one of the optional features of the seat assembly 20 includes actuators that are mounted to the upper cross member 30. The actuators may include a power head rest dump mechanism 40 for actuating a head restraint 42 (FIG. 1) of the seat assembly 20. The motor-driven head rest dump mechanism 40 is enclosed between the carrier 32 and the cover 38 for protection from external forces. Another optional feature of the seat assembly 20 includes a motor-driven backrest mounted flat-screen 44 for rear seat entertainment (RSE). The RSE drive 44 is also concealed from occupant forces by the carrier 32. The integration of wiring for these actuators will be discussed below in the context of FIGS. 6-8.

Referring again to FIG. 1, the seat assembly 20 may also include a head restraint substrate 46 mounted to the upper cross member 30 as an interface to permit actuation of the head restraint 42 and the RSE screen 44 relative to the seat back 22 without exposing the actuators to external forces at the top of the seat back 22. The carrier 32 and the cover 38 are sized to collectively engage the head restraint substrate 46 for concealing the internal actuators and to provide trim retainer reaction support and stabilization.

With reference again to FIGS. 1 and 2, the carrier 32 also includes pneumatic articulation integration according to an optional embodiment for providing fluid and flexible adjustment of the seating surface. A plurality of air bladders or air cells 48 are installed on the front surface 36 of the carrier 32. The air cells 48 may include a flexible material layer 50 such as felt, to install the air cells 48 upon retainers 52 formed into the carrier 32. Alternatively, the flexible support layer 50 may be formed integrally with the air cells 48.

Referring now to FIGS. 2 and 3, the air cell retainers 52 each include a projection 54 extending forward from the carrier 32 providing a teardrop shape. An opening 56 is formed through the carrier 32 partially surrounding each projection 54 to provide clearance for the support layer 50 of the air cells 48. Referring again to FIGS. 1 and 3, the air cell support layer 50 includes a plurality of tabs 58 with apertures 60 formed therethrough for receipt of the one of the corresponding projections 54 of the carrier retainers 52. The air cells 48 are supported upon the retainers 52 and the carrier 32 provides a stable reaction surface to the air cells 48 as the air cells 48 are inflated or deflated. The projections 54 are oversized relative to the apertures 60 to provide an interference fit to retain the air cells 48 upon the carrier 32 once installed.

As illustrated in FIG. 1, a pneumatic tube 62 is connected to the air cells 48 to convey pressurized air to inflate and deflate the air cells. A channel 64 is formed into the carrier 32 to receive the tube 62. A plurality of retainers 66 are formed along the channel 64 to retain the tube 62 within the channel 64. The retainers 66 may be spaced apart less than a width of the tube 62 in order to prevent inadvertent removal of the tube 62 from the channel 64.

By integrating the air cells 48 and tube 62 into the carrier 32, the carrier 32 and air cells 48 can be preassembled as a subassembly prior to installation in the seat assembly 20. The preassembly permits a reduction of cycle time of the assembly of the vehicle seat assembly 20. Additionally, multiple subassemblies may be preassembled for various seat assemblies 20.

Referring now to FIGS. 1, 2 and 4, the carrier 32 includes a plurality of receptacles 68 for receipt of a plurality of trim clips 70. Each receptacle 68 includes a cross shaft 72 to fasten the trim clip 70. The cross shafts 72 may be formed integrally with the carrier 32. Alternatively, the cross shafts 72 may be formed from pins that are insert molded into the carrier 32. The trim clips 70 may be formed from an elastic material such as an elastomeric polymer or metal. As illustrated in FIG. 4, each trim clip 70 includes a slot 74 to receive the cross shaft 72 and a retention flange 76 to retain the shaft 72 within the slot 74. Each trim clip 70 also includes a narrowed slot 78 to receive a trim component (not shown). By integrating the trim clips 70 into the carrier 32, extra components are eliminated from the seat assembly 20, thereby reducing material costs, weight and manufacturing costs and time.

Figure 5:
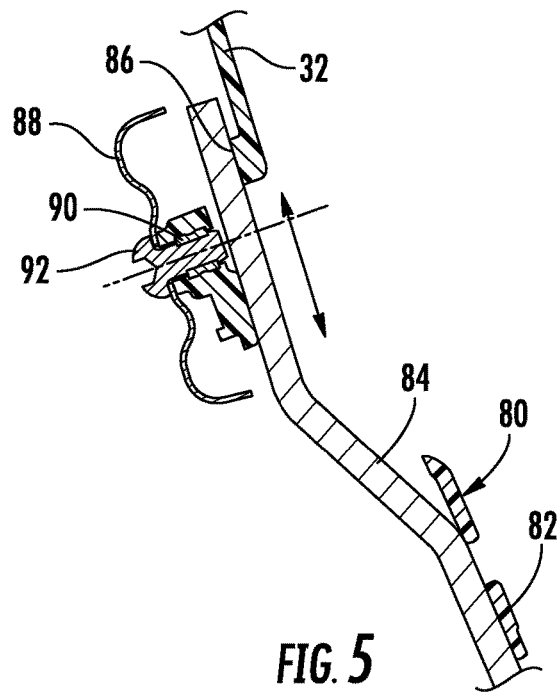
FIG. 5 is a partial section view of a seat subassembly taken along section line 5-5 in FIG. 1.

FIGS. 1 and 5 illustrate that the seat assembly 20 includes a seat back suspension 80, which includes a support board 82 connected to a lower end of the seat back 22. The suspension board 82 may be fixed at the lower end of the seat back 22 to permit the support board 82 to flex along the length of the support board 82 as occupant loads are applied to the support board 82. The suspension 80 also includes a pair of upright suspension wires 84 extending from the support board 82. The suspension wires 84 are received in guides 86 that are formed in the carrier 32. The guides 86 permit the suspension wires 84 to translate within guides 86 as occupant loads are applied and removed from the support board 82.

As discussed above, the seat assembly 20 is sufficiently robust to withstand concentrated loading, such as an occupant kneeling upon a fully reclined seat back 22. Referring to FIGS. 1, 2 and 5, the frame 24 includes an intermediate cross member 88 connected to the pair of side members 26, 28 and spaced below the upper cross member 30. The intermediate cross member 88 provides additional support to the frame 24, and also provides support to the carrier 32. The intersection of the suspension wires 84 and the guides 86 of the carrier 32 are aligned with the intermediate cross member 88 to distribute loading on the suspension 80 to the frame 24.

Referring now to FIG. 5, the carrier 32 includes a pair of insert-molded threaded nuts 90 that are aligned with the guides 86. A pair of threaded fasteners 92 fasten the carrier nuts 90 to the intermediate cross member 88 to enhance the fastened support of the carrier 32 upon the frame 24, and to provide additional support at the input of loading from the suspension 80 upon the carrier 32.

Figure 6:
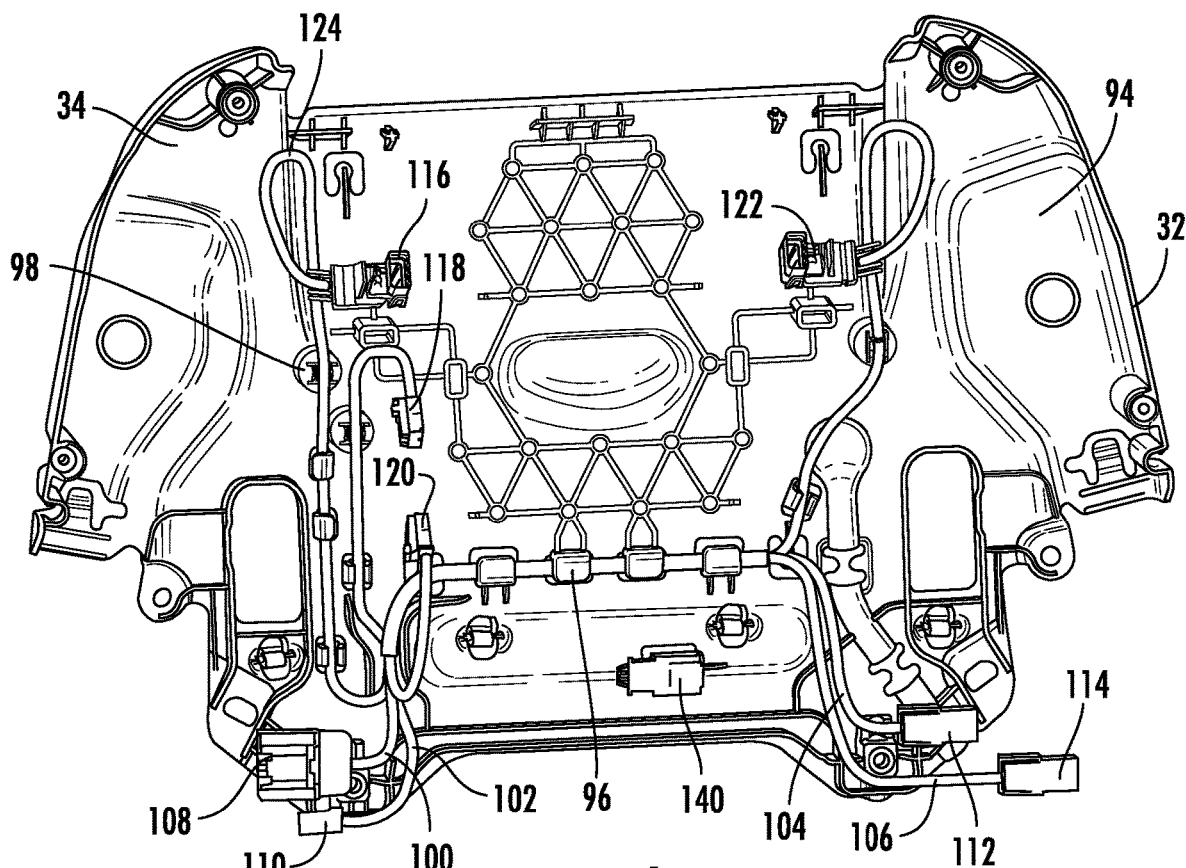
FIG. 6 is a partial rear perspective view of the seat assembly of FIG. 1.

FIG. 6 illustrates a rear surface 94 of the carrier 32, which faces and is fastened to the frame 24. The carrier 32 includes a plurality of wire retainers 96 formed integrally into the carrier 32. A plurality of wire hooks 98 are also fastened to the rear surface 94 of the carrier 32. A plurality of connector wires 100, 102, 104, 106 are installed on the rear surface 94 of the carrier 32 and retained by the retainers 96 and the hooks 98. The connector wires 100, 102, 104, 106 collectively provide a sub-harness for the seat subassembly of the carrier 32 and integrated components.

Figure 7:
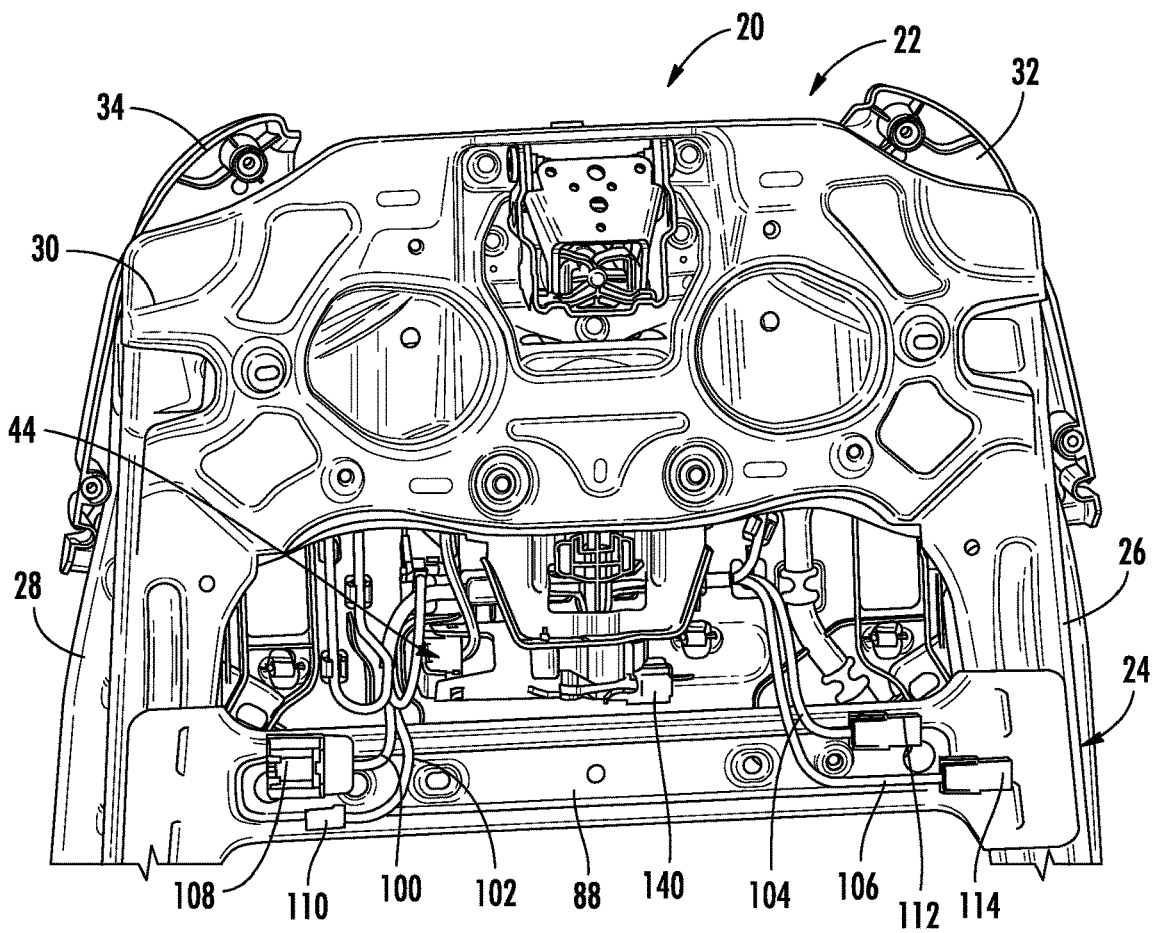
FIG. 7 is a rear perspective view of the seat assembly of FIG. 1.

A first terminal 108, 110, 112, 114 is provided on each of the wires 100, 102, 104, 106 to extend from rear surface 94 of the carrier 32 and connect to a wire harness of the seat assembly 20. Referring to FIG. 7, the wires 100, 102, 104, 106 each has a sufficient length to pass between the upper cross member 30 and the intermediate cross member 88 to extend the first terminals 108, 110, 112, 114 to connect to terminals of the wire harness of the seat assembly 20.

Referring again to FIG. 6, each of the wires 100, 102, 104, 106 has a second terminal 116, 118, 120, 122 provided on an opposed end for connection to one of the actuators 40, 44. For example, the second terminals 116, 122 connect to and provide power to the power head rest dump mechanism 40; and the second terminals 118, 120 connect to the RSE actuator 44. Each of the wires 100, 102, 104, 106 has a length to exceed the last retainer and hook 96, 98 to provide a hoop 124 in the wire length. The lengths of the wires 100, 102, 104, 106 are also designed to provide strain relief for both static and dynamic conditions of the actuators 40, 44. The wire length and fixation points are designed to compensate travel of the actuators 40, 44, without disturbing overlength in a static condition of the actuators 40, 44.

During assembly of the carrier 32 to the frame 24, the first terminals 108, 110, 112, 114 are connected to the wire harness first, and the wire hoops 124 permit the operator to extend each of the wires 100, 102, 104, 106 from the rear surface 94 of the carrier 32 to the actuators 40, 44. The wires 100, 102, 104, 106 are sized so that the top of the carrier 32 can be pivoted away from the frame while connecting the second terminals 116, 118, 120, 122 to the actuators 40, 44. For example, the carrier 32 can be tilted thirty degrees away from the frame 24. Once the second terminals 116, 118, 120, 122, the operator can pivot the top of the carrier 32 toward the frame 24, thereby collapsing the wire hoops 124 for concealment behind the carrier 32 as the carrier 32 is fastened to the frame 24.

Figure 8:
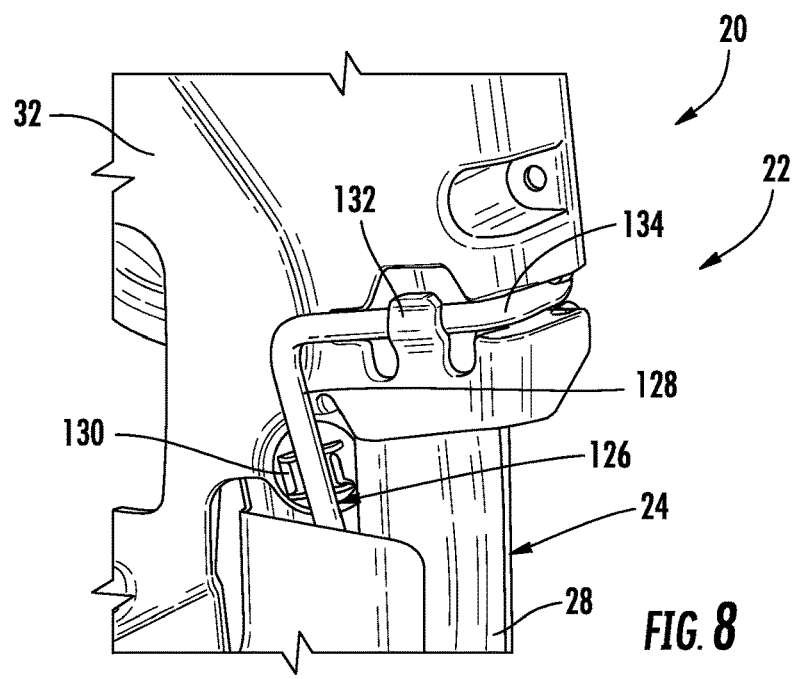
FIG. 8 is another enlarged front perspective view of the seat assembly of FIG. 1, illustrating a retainer according to another embodiment.

Referring now the FIG. 8, the seat assembly 20 has a wire harness 126 with wires 128 that each extend up one of the side members 28. The wire 128 is connected to a wire hook 130 on the side member 28. The carrier 32 includes a retainer 132 sized to receive the wire 128. The substrate 32 also includes a channel 134 extending laterally around the side of the carrier 32. The wire 128 extends through the channel 134 and between the carrier 32 and the cover 38 to connect to the first terminals 108, 110. The wire harness 126 includes another wire 128 on the other side member 26 to connect to the other two first terminals 112, 114.

By installing the wire sub-harness of wires 100, 102, 104, 106 on the carrier 32, the carrier 32, wires 100, 102, 104, 106, and terminals 108, 110, 112, 114, 116, 118, 120, 122 can be preassembled as a subassembly separate from the assembly of the seat assembly 20. This preassembly facilitates cable management with common ground consolidation. The carrier 32 enables off-line sub-assembly of the sub-harness for later configuration. By simplifying the process for connecting the wire harness 126, significant manufacturing time is saved while enhancing repeatability of the assembled components. The modularity of the subassembly permits utilization with various seat assemblies 20 with various wire harness and actuator configurations.

Referring again to FIG. 1, the carrier 32 also includes a pair of apertures 136 for connection of a pair of functional trim cover cords 138. The trim cover cords 138 distribute loads that are applied to the vehicle seat trim (not shown) to the carrier 32. For example, during a condition wherein a side airbag is deployed, loads from the side airbag deployment that are imparted upon the vehicle seat trim are transferred through the trim cover cords 138 to the carrier 32 to dissipate at least some of the deployment energy through the trim cover and the trim cover cords 138 to the plastic carrier 32.

With reference now to FIGS. 6 and 7, the carrier 32 offers an optional docking or parking station/feature to receive and securely lock a connector plug 140, such as for the RSE actuator 44.

The carrier 32 is efficiently and inexpensively tooled for customized features and component integration for various seat assembly applications. The carrier 32 is a standard part that is non-handed. The carrier 32 provides a seat package depth efficiency enabler. The carrier 32 is also whiplash neutral whereby the frame 24 receives first dummy contact on penetration because parts flex about the fastened sides of the carrier 32.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A vehicle seat assembly comprising:
a vehicle seat frame;
a seat substrate mounted to the vehicle seat frame, to provide a support surface for an occupant, the seat substrate being formed with a pair of guides, each sized to receive one of a pair of suspension wires of a vehicle seat suspension for translation of the pair of suspension wires within the pair of guides and to distribute an occupant load from the pair of suspension wires to the seat substrate; and a vehicle seat suspension mounted to the vehicle seat frame, with a pair of suspension wires extending into the pair of guides;

wherein a plurality of receptacles is formed into the seat substrate; and wherein the vehicle seat assembly further comprises a plurality of trim retention clips, each installed into one of the plurality of receptacles.

2. The vehicle seat assembly of claim 1 wherein the vehicle seat frame comprises a pair of side members and an upper cross member interconnecting the pair of side members; and wherein the seat substrate is mounted to the pair of side members and the upper cross member.

3. The vehicle seat assembly of claim 2 wherein the vehicle seat frame further comprises an intermediate cross member connected to the pair of side members and spaced apart from the upper cross member; and wherein the seat substrate is fastened to the intermediate cross member.

4. The vehicle seat assembly of claim 3 wherein the seat substrate is fastened to the intermediate cross member at a pair of locations, each aligned with one of the pair of guides.

5. The vehicle seat assembly of claim 3 further comprising a first pair of threaded fasteners insert-molded into the seat substrate; and a second pair of threaded fasteners fastened to the intermediate cross member and the first pair of threaded fasteners.

6. A seat subassembly comprising:

a substrate adapted to be mounted to a frame of a vehicle seat assembly, to provide a support surface for an occupant;

a plurality of retainers provided on the substrate; and an air bladder fastened to the plurality of retainers;

wherein the plurality of retainers each comprise a projection extending from the substrate with an opening formed through the substrate and partially surrounding the projection;

and wherein the air bladder further comprises a flexible support layer with a plurality of apertures formed therein, each sized to receive one of the plurality of projections on the substrate.

7. The seat subassembly of claim 6 wherein each of the apertures is sized smaller than a width of the corresponding projection.

8. The seat subassembly of claim 6 wherein a channel is formed into the substrate; and wherein the seat subassembly further comprises at least one fluid tube in fluid communication with the air bladder and received within the channel.

9. A method of assembling a seat assembly comprising:
assembling a seat subassembly according to claim 6 by fastening the air bladder to the substrate; and
assembling the assembled seat subassembly to a frame of a vehicle seat assembly.

10. A vehicle seat assembly comprising:
a vehicle seat frame;
a seat subassembly, mounted to the vehicle seat frame, the seat subassembly comprising:
  a substrate adapted to be mounted to a frame of a vehicle seat assembly,
  a first plurality of terminals mounted to the substrate for electrical connection to a wire harness, and
  a second plurality of terminals mounted to the substrate, each in electrical communication with one of the first plurality of terminals, for electrical connection to a plurality of electrical devices in the vehicle seat assembly;
a wire harness mounted to the vehicle seat frame, the wire harness comprising a plurality of wires, each electrically connected to one of the first plurality of terminals;
wherein the first plurality of terminals and the second plurality of terminals are mounted on the substrate on an inner surface that faces the vehicle seat frame; and
a cover fastened to the vehicle seat frame spaced apart from the substrate with the frame therebetween to enclose the second plurality of terminals within the vehicle seat assembly.

11. The vehicle seat assembly of claim 10 further comprising a plurality of wires each electrically connected to one of the first plurality of terminals and to one of the second plurality of terminals; and wherein the substrate further comprises a plurality of retainers sized to retain the plurality of wires.

12. The vehicle seat assembly of claim 10 wherein the vehicle seat frame comprises a pair of side members and at least one upper cross member;

wherein the seat substrate is mounted to the vehicle seat frame proximate to the upper cross member; and wherein the vehicle seat assembly further comprises:

an actuator supported by the vehicle seat frame with at least one terminal connected at least one of the plurality of second terminals, and a head restraint operably connected to the actuator for adjustment by the actuator.

13. A method of assembling a seat assembly comprising:
assembling a seat subassembly comprising:
  a substrate adapted to be mounted to a frame of a vehicle seat assembly,
  a first plurality of terminals mounted to the substrate for electrical connection to a wire harness, and
  a second plurality of terminals mounted to the substrate, each in electrical communication with one of the first plurality of terminals, for electrical connection to a plurality of electrical devices in the vehicle seat assembly, by installing the first plurality of terminals and the second plurality of terminals to the substrate;
assembling the assembled seat subassembly to a frame of a vehicle seat assembly;
installing a wire harness to the vehicle seat frame prior to assembling the assembled seat subassembly to the vehicle seat frame;
connecting the wire harness to the first plurality of terminals; and
fastening the substrate to the vehicle seat frame after the wire harness in connected to the first plurality of terminals.

14. A vehicle seat assembly comprising:
a vehicle seat frame;
a seat substrate mounted to the vehicle seat frame to provide a support surface for an occupant, the seat substrate being formed with a pair of guides, each sized to receive one of a pair of suspension wires of a vehicle seat suspension for translation of the pair of suspension wires within the pair of guides and to distribute an occupant load from the pair of suspension wires to the seat substrate;

a vehicle seat suspension mounted to the vehicle seat frame, with a pair of suspension wires extending into the pair of guides;

wherein the vehicle seat frame comprises a pair of side members and an upper cross member interconnecting the pair of side members;

wherein the seat substrate is mounted to the pair of side members and the upper cross member;

wherein the vehicle seat frame further comprises an intermediate cross member connected to the pair of side members and spaced apart from the upper cross member;

wherein the seat substrate is fastened to the intermediate cross member;

a first pair of threaded fasteners insert-molded into the seat substrate; and a second pair of threaded fasteners fastened to the intermediate cross member and the first pair of threaded fasteners.

15. A vehicle seat assembly comprising:
a vehicle seat frame;
a seat subassembly comprising:
   a substrate mounted to the vehicle seat frame,
   a first plurality of terminals mounted to the substrate for electrical connection to a wire harness, and
   a second plurality of terminals mounted to the substrate, each in electrical communication with one of the first plurality of terminals, for electrical connection to a plurality of electrical devices in the vehicle seat assembly; and a wire harness mounted to the vehicle seat frame, the wire harness comprising a plurality of wires, each electrically connected to one of the first plurality of terminals;

wherein the vehicle seat frame comprises a pair of side members and at least one upper cross member;

wherein the seat substrate is mounted to the vehicle seat frame proximate to the upper cross member; and wherein the vehicle seat assembly further comprises:
   an actuator supported by the vehicle seat frame with at least one terminal connected at least one of the plurality of second terminals, and
   a head restraint operably connected to the actuator for adjustment by the actuator.

\* \* \* \* \*